(12) United States Patent
Tanaka et al.

(10) Patent No.: US 7,984,626 B2
(45) Date of Patent: Jul. 26, 2011

(54) DIE ASSEMBLY FOR MOLDING OF GLASS ELEMENT

(75) Inventors: Ryuji Tanaka, Numazu (JP); Toshiyuki Takagi, Susono (JP); Toshihisa Kamano, Numazu (JP); Isao Matsuzuki, Numazu (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 218 days.

(21) Appl. No.: 12/162,583

(22) PCT Filed: Jan. 29, 2007

(86) PCT No.: PCT/JP2007/051386
§ 371 (c)(1),
(2), (4) Date: Aug. 26, 2008

(87) PCT Pub. No.: WO2007/086558
PCT Pub. Date: Aug. 2, 2007

(65) Prior Publication Data
US 2009/0025430 A1    Jan. 29, 2009

(30) Foreign Application Priority Data
Jan. 30, 2006    (JP) ................. 2006-020599

(51) Int. Cl.
*B29D 11/00*    (2006.01)
*C03B 11/00*    (2006.01)
*C03B 11/06*    (2006.01)
*C03B 11/08*    (2006.01)

(52) U.S. Cl. ............. 65/318; 65/305; 65/323; 264/2.3

(58) Field of Classification Search ............ 65/305, 65/319; 264/1.1–2.7
See application file for complete search history.

(56) References Cited

U.S. PATENT DOCUMENTS

| | | | | |
|---|---|---|---|---|
| 2,233,057 A | * | 2/1941 | Luce | 65/305 |
| 2,333,131 A | * | 11/1943 | Hasenzahl et al. | 264/325 |
| 5,173,100 A | * | 12/1992 | Shigyo et al. | 65/102 |
| 5,697,996 A | * | 12/1997 | Tsuda | 65/29.14 |

(Continued)

FOREIGN PATENT DOCUMENTS
JP    05-286732    11/1993
(Continued)

OTHER PUBLICATIONS
International Search Report of PCT/JP2007/051386.
(Continued)

*Primary Examiner* — Matthew J Daniels
*Assistant Examiner* — Cynthia Szewczyk
(74) *Attorney, Agent, or Firm* — DLA Piper LLP US

(57) ABSTRACT

In the initial stage of die-opening operation when an upper core 3 moves upward together with an upper die plate 1, an upper cavity die 2 is biased downwardly by an elastic member 10 so as to press the lower surface of the upper cavity die 2 against the upper surface of a lower cavity die 6 and keep their contact, thereby forcing a molded glass element 4 to remain on a lower core 5 by utilizing the difference in outside diameter between the lower core 5 and the upper core 3. This makes it possible to securely release the molded glass element 4 from the upper core 3 and leave the molded product on the lower core 5 upon die opening, enabling smooth removal and automated transportation of the molded product.

7 Claims, 3 Drawing Sheets

U.S. PATENT DOCUMENTS

| | | | |
|---|---|---|---|
| 5,855,824 A * | 1/1999 | Saito et al. | 264/2.2 |
| 5,904,746 A * | 5/1999 | Okada | 65/66 |
| 2003/0056545 A1* | 3/2003 | Murakoshi et al. | 65/319 |
| 2003/0214061 A1* | 11/2003 | Hosoe | 264/2.5 |
| 2004/0211222 A1* | 10/2004 | Hosoe | 65/374.12 |
| 2008/0003324 A1* | 1/2008 | Utsugi | 425/542 |

FOREIGN PATENT DOCUMENTS

| | | |
|---|---|---|
| JP | 08-109031 | 4/1996 |
| JP | 11-49523 | 2/1999 |
| JP | 2005-075994 | 3/2005 |
| JP | 05-281053 | 10/2005 |

OTHER PUBLICATIONS

English language translation of JP-08-109031.
English language translation of JP-11-49523.
English language translation of JP-05-286732.
International Preliminary Report on Patentability in PCT/JP2007/051386.
English Translation of JP 2005-281053.
Japanese Office Action issued in JP 10-2008-7021188 on Dec. 24, 2010.
English Language Translation of Japanese Office Action issued in JP 10-2008-7021188 on Dec. 24, 2010.
English Language Abstract of JP 2005-075994 published on Mar. 24, 2005.
English Language Translation of JP 2005-075994 published on Mar. 24, 2005.
English language Abstract of JP-05-286732 published Nov. 2, 1993.
English language Abstract of JP-08-109031 published Apr. 30, 2011.
English language Abstract of JP-11-49523 published Feb. 23, 1999.
English language Abstract of JP 2005-281053 published Oct. 13, 2005.
English Translation of JP 2005-281053 published Oct. 13, 2005.

* cited by examiner

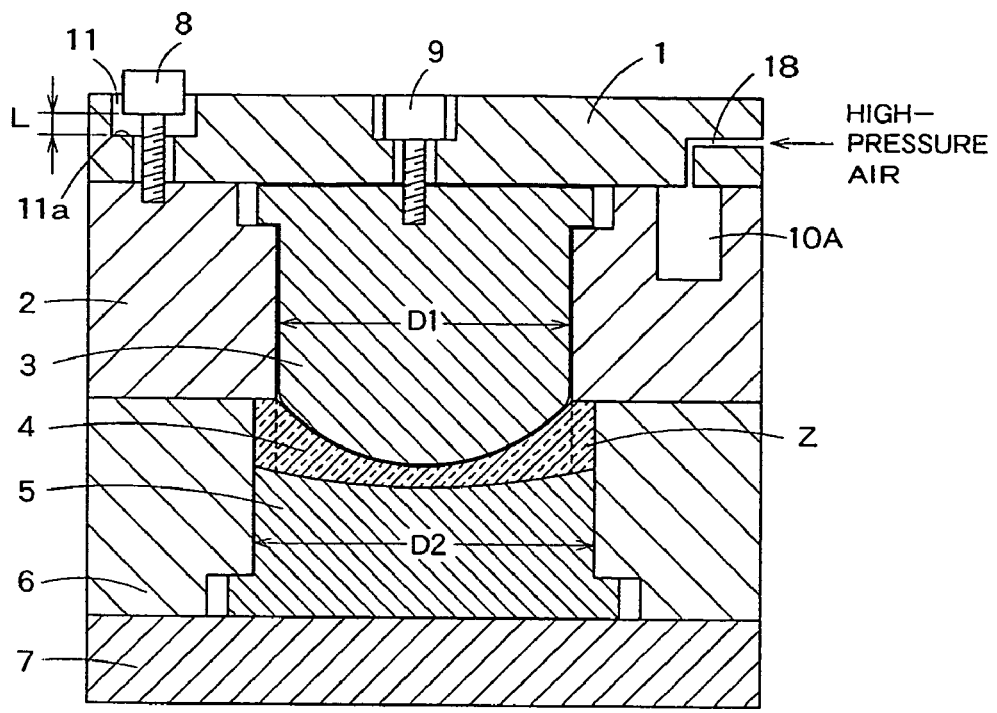
F I G. 3
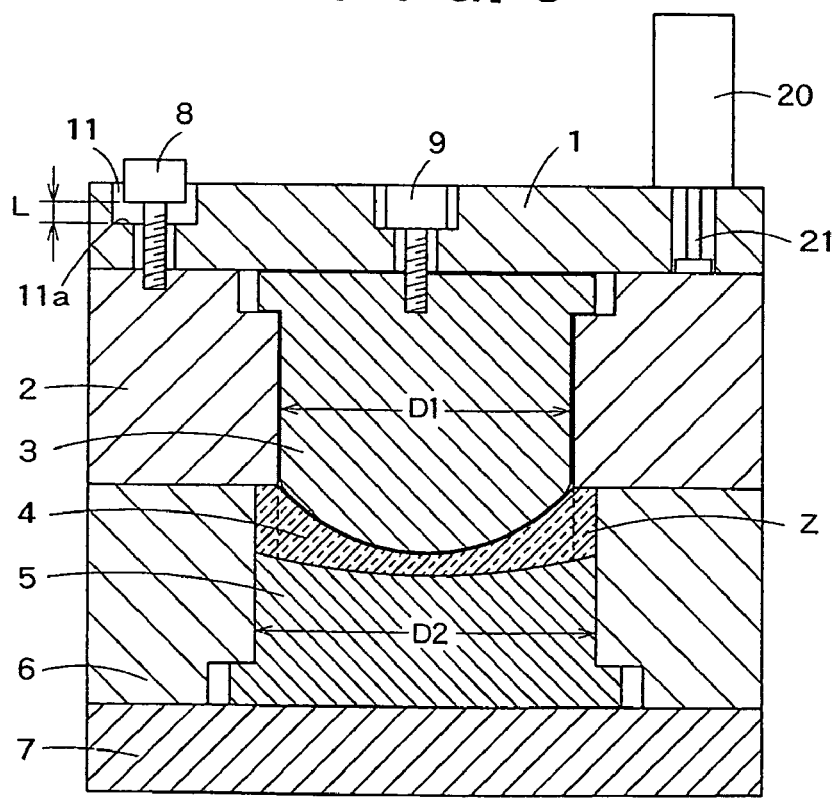
F I G. 4

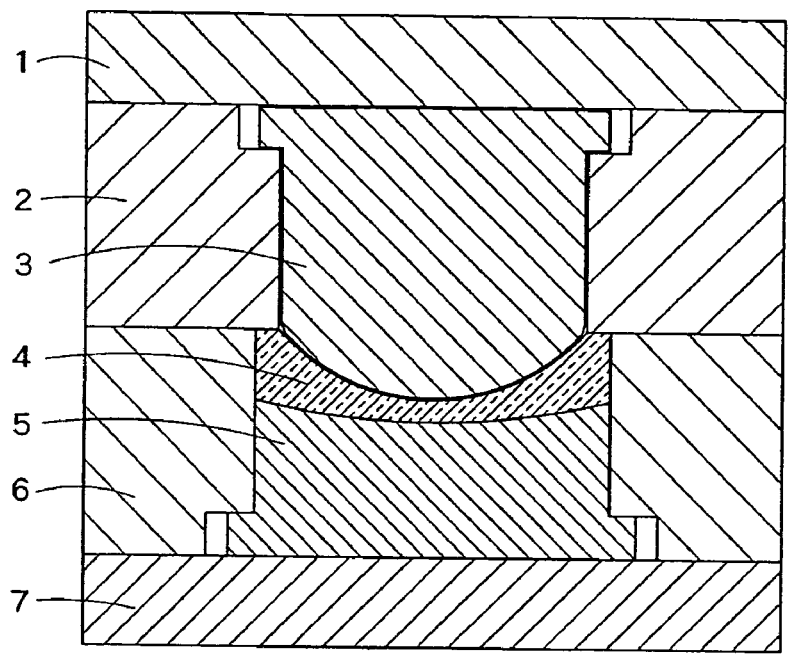
F I G. 5
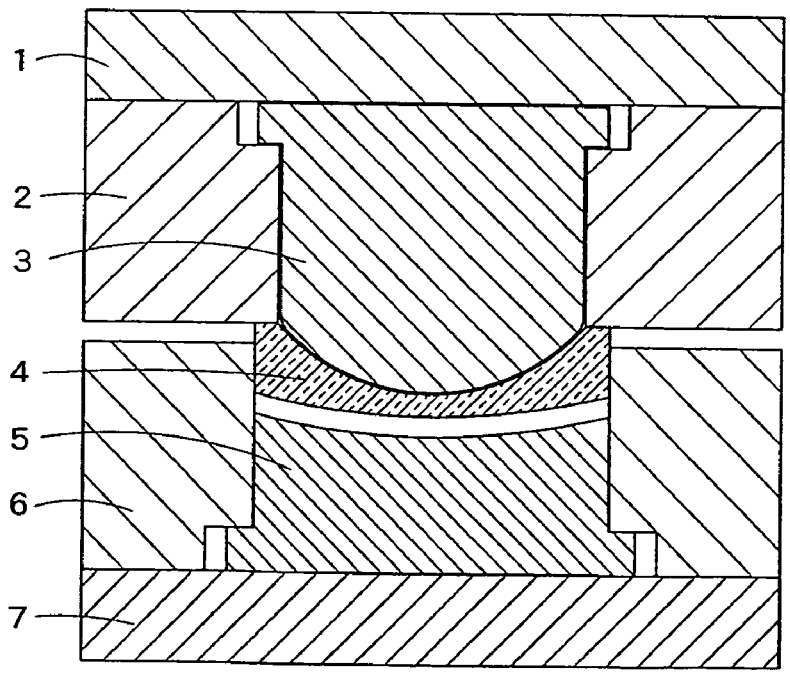
F I G. 6

DIE ASSEMBLY FOR MOLDING OF GLASS ELEMENT

TECHNICAL FIELD

The present invention relates to a die assembly for molding of a glass element, and more particularly to the structure of a die assembly for use in molding of an optical glass element having a large curvature or a glass element having a shape hard to release from a die.

BACKGROUND ART

In molding of a glass element, the glass element is formed by a series of process steps comprising heating and pressing a die assembly, and cooling the die assembly. Especially when molding an optical glass element having a large curvature or when molding a glass element having a shape hard to release from a die, the molded product can bite into a core or can crack due to thermal contraction of a die assembly upon cooling.

FIGS. 5 and 6 shows a conventional common die structure for use in molding of such a glass element, FIG. 5 illustrating a pair of molding die assemblies in a die-clamped state and FIG. 6 illustrating the pair of molding die assemblies in a die-open state.

In particular, in FIGS. 5 and 6, reference numerals 3 and 5 denote a pair of upper and lower cores each having a molding face for an optical element or a not-shown glass element. Reference numerals 2 and 6 denote a pair of an upper cavity die and a lower cavity die in which the pair of upper and lower cores 3, 5 are slidably fit, respectively. Reference numerals 1 and 7 denote a pair of an upper die plate and a lower die plate which support the pair of upper and lower cores 3, 5 and the pair of upper and lower cavity dies 2, 6. Reference numeral 4 denotes a molded glass element.

A glass material having a yield point of 620° C. may be used as a material for the molded glass element 4. The molded product can be produced by pressing the glass material at 15 kN at 610° C. while closing the die assembly, and then slowly cooling the material to 510° C. Thereafter, the die assembly is opened by 0.5 mm. The molded glass element 4 can remain adhering to the convex surface of the upper core 3 after opening the die assembly, as shown in FIG. 6. This is a problem in the conventional molding die assembly.

An apparatus for molding an optical element has been proposed which can uniformly heat or cool a molding region without damaging the effective molding face of a molding die (Japanese Patent Laid-Open Publication No. 5-286732). In the molding apparatus, at least one hole or grooves is provided in the upper end surface of a middle die, and a spring for upwardly biasing an upper die is provided in the hole or groove. The spring supports the weight of the upper die. An optical element is produced by heating and softening an optical element material between the upper die, the middle die and a lower die, and press-molding the material while applying a pressure to the material by lowering a cylinder on the upper die and thereby pressing on the spring.

The conventional molding die assembly shown in FIGS. 5 and 6 has the drawback that especially when molding an optical glass element having a large curvature or when molding a glass element having a shape hard to release form a die assembly, the molded product can bite into the upper core 3 or the lower core 5 or can crack due to thermal contraction of the die assembly upon cooling, as described above. The cracking of the molded product can damage the upper core 3 or the lower core 5. The molded product can remain adhering to the upper core 3 after opening the die assembly. In addition, there is a case in which the molded product cannot be taken out of the lower core 5. These problems make it difficult to take the molded product out of the die assembly and pose serious obstacles to automated transportation and continuous molding of the molded product.

The patent document, Japanese Patent Laid-Open Publication No. 5-286732, proposes the provision in the middle die of the spring which upwardly biases the upper die so as to balance the load of the upper die, thereby enabling good control of the upper die when it is pressed. The patent document, however, is silent as to how to improve release of a molded product from the die.

DISCLOSURE OF THE INVENTION

After intensive study on the above problems, it has now been found by the present inventors that the above problems can be solved fundamentally by making an upper cavity die 2 as shown in FIG. 3, in which an upper core 3 is fit, not move together with the upper core 3 at the time of opening of the die assembly when the upper core 3 moves upward.

It is therefore an object of the present invention to provide a die assembly for molding of a glass element, which can forcibly detach a molded glass element from an upper die assembly, thereby preventing cracking of the molded product and damage to upper and lower cores and, in addition, can securely release the molded product from the upper die assembly and leave it on a lower die assembly when opening the die assemblies, thereby enabling smooth automated transportation and continuous molding of the molded product.

In order to achieve the object, the present invention provides a die assembly for molding a glass element in a molding apparatus which molds the glass element by placing a glass element material between a pair of upper and lower die assemblies, and heating and pressing the pair of die assemblies and the glass element material, the die assembly comprising: an upper core having a upper molding face for the glass element; a lower core having a lower molding face for the glass element and having a larger outside diameter than the outside diameter of the upper core; an upper cavity die in which the peripheral surface of the upper core is slidably fit; a lower cavity die in which the peripheral surface of the lower core is slidably fit; an upper die plate for supporting the upper core and the upper cavity die at their upper ends; a lower die plate for supporting the lower core and the lower cavity die at their lower ends; and means for downwardly biasing the upper cavity die so as to press the lower surface of the upper cavity die against the upper surface of the lower cavity die and keep their contact in the initial stage of die-opening operation when the upper core moves upward together with the upper die plate, thereby forcing the glass element to remain on the lower cavity die side by utilizing the difference in outside diameter between the lower core and the upper core.

In a preferred embodiment of the present invention, said means includes an elastic member disposed between the upper surface of the lower cavity die and the upper die plate, and a locking section for locking the upper cavity die in such a manner that when the upper die plate moves upward together with the upper core and the distance between the upper die plate and the upper cavity die has reached a predetermined distance, the upper cavity die can begin to move upward together with the upper die plate.

The locking section may be comprised of a stopper bolt, threadedly engaging the upper cavity die in its upper surface, for limiting the distance between the lower surface of the upper die plate and the upper surface of the upper cavity die to the predetermined distance, and a hole formed in the upper die plate, having a locking step portion on which a head portion of the stopper bolt is to be locked.

The elastic member may be a heat-resistant elastic member made of, for example, a ceramic material, and preferably be a disc spring made of an Inconel material manufactured by International Nickel Company. A heat-resistant coil spring or leaf spring may also be preferably used.

According to the present invention, a molded glass element can be securely released from the upper core and left on the lower core upon die opening without adhesion of the molded product to the upper core. This makes it possible to prevent cracking of the molded product and breakage of the cores and smoothly take the molded product out of the die assembly and automatically transport it, thus securely continuing molding cycles.

BRIEF DESCRIPTION OF THE DRAWINGS

FIG. 3 is a vertical sectional view of a variation of the molding die assembly of the present invention;

FIG. 4 is a vertical sectional view of another variation of the molding die assembly of the present invention;

FIG. 5 is a vertical sectional view of a conventional molding die assembly, illustrating the die assembly in a die-clamped state; and FIG. 6 is a vertical sectional view of the conventional molding die assembly of FIG. 5, illustrating the die assembly in a die-open state.

BEST MODE FOR CARRYING OUT THE INVENTION

Figure 1:
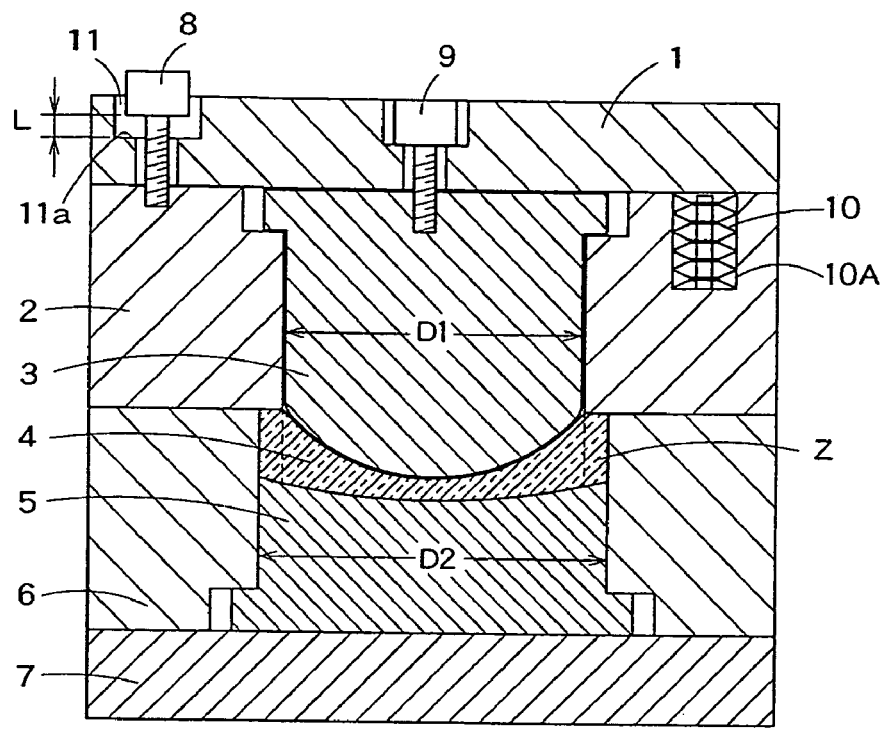
FIG. 1 is a vertical sectional view of a molding die assembly according to an embodiment of the present invention, illustrating the die assembly in a die-clamped state.

Preferred embodiments of the present invention will now be described in detail with reference to the drawings. Of the reference numerals shown in FIGS. 1 and 2, the same reference numerals as those of FIGS. 3 and 4 denote the same components. The following description will be made mainly of differences from the embodiments shown in FIGS. 3 and 4.

Figure 2:
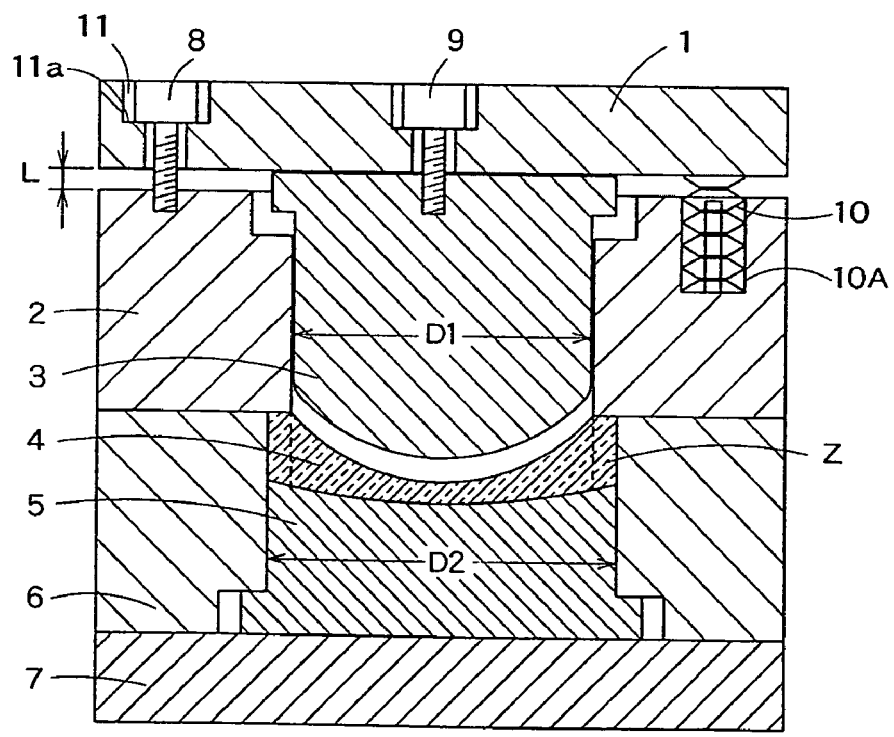
FIG. 2 is a vertical sectional view of the molding die assembly of FIG. 1, illustrating the die assembly in a die-open state.

In FIGS. 1 and 2, reference numerals 3 and 5 denote a pair of upper and lower cores each having a molding face for an optical glass element. Reference numerals 2 and 6 denote a pair of an upper cavity die and a lower cavity die in which the pair of upper and lower cores 3, 5 are slidably fit, respectively. Reference numerals 1 and 7 denote a pair of an upper die plate and a lower die plate which support the pair of upper and lower cores 3, 5 and the pair of upper and lower cavity dies 2, 6. Reference numeral 4 denotes a molded glass element molded between the molding face of the upper core 3 and the molding face of the lower core 5.

In FIG. 1, reference numeral 9 denotes a fixing bolt for fastening the upper core 3 to the lower surface of the upper die plate 1. Reference numeral 10 denotes a heat-resistant elastic member housed in a recess 10A that opens to the upper surface of the upper cavity die 2. In this embodiment a disc spring of Inconel 718 (trade name of International Nickel Company, longitudinal elastic modulus 198220 N/mm2, 200N at a deflection of 0.2 mm, operating temperature range: room temperature to 650° C.) is used as the elastic member 10. The spring has been confirmed to be durable after more than 2000 times of repeated use.

In the die-clamped state of the molding die assembly, shown in FIG. 1, the elastic member 10 is compressed with its upper end in contact with the lower surface of the upper die plate 1, and thus the lower surface of the upper die plate 1 is receiving the elastic force of the elastic member 10. The reaction force of the same intensity acts on the upper cavity die 2, downwardly biasing the upper cavity die 2.

Instead of the disc spring of Inconel 718 used as the elastic member 10 in this embodiment, it is also possible to use a heat-resistant disc spring, coil spring, leaf spring, or the like made of a heat-resistant material, e.g. a ceramic material such as silicon nitride Si3N4 (operating temperature range: room temperature to 1150° C.).

In FIG. 1, reference symbol D1 denotes the outside diameter of the upper core 3, and D2 denotes the outside diameter of the lower core 5. The outside diameter of the lower core 5 is larger than the outside diameter D1 of the upper core 3 which provides a concave surface to the molded glass element 4. Reference symbol Z denotes the peripheral portion of the molded glass element 4. A step is formed by the difference between the outside diameter D1 of the upper core 3 and the outside diameter D2 of the lower core 5, and the upper surface of the peripheral portion Z of the molded glass element 4 is in contact with the lower surface of the upper cavity die 2.

The upper die plate 1 and the upper cavity die 2 are connected by a stopper bolt 8. A hole 11 with a step in it is formed in the upper die plate 1, and the stopper bolt 8 is inserted into the hole 11.

The threaded portion of the stopper bolt 8 is in threaded engagement with the upper cavity die 2 in its upper surface. A locking step portion 11a is formed in the hole 11. A distance L is provided between the lower surface of the head portion of the stopper bolt 8 and the seating surface of the locking step portion 11a. When the upper die plate 1 is raised by the distance L upon die opening, the head portion of the stopper bolt 8 is locked on the seating surface, as shown in FIG. 2, so that the distance between the lower surface of the upper die plate 1 and the upper surface of the upper cavity die 2 can be limited to the distance L.

In this embodiment the stopper bolt 8 is the same bolt as the fixing bolt 9 and primarily is to fix the upper cavity die 2 to the upper die plate 1. When inserting the stopper bolt 8 into the hole 11 and screwing the bolt into the upper cavity die 2, the screwing is stopped when the distance L has been reached, without fully screwing the bolt into the die. Of course, the distance L may be adjusted.

The operation of the die assembly for molding of a glass element according to this embodiment, having the above-described construction, will now be described.

After molding the molded glass element 4 by press molding, a die-opening operation is performed starting from the die-clamped state shown in FIG. 1. The die-opening operation is carried out by upwardly moving the upper die plate 1 which is connected to a not-shown vertical movement drive.

Referring to FIG. 1, when the upper die plate 1 begins to move upward, the upper core 3 also moves upward together with the upper die plate 1, while the upper cavity die 2 is pressed downward by the elastic force of the elastic member 10 and kept in contact with the upper surface of the lower cavity die 6. Accordingly, the position of the molded glass element 4 is maintained with the upper surface of the peripheral portion Z kept held by the step in the lower surface of the upper cavity die 2. Therefore, the molded glass element 4, even when the concave surface has a large curvature, can be smoothly released from the molding face of the upper core 3 without causing cracking of the molded product or its biting into the cores.

Further, when the upper die plate 1 and the upper core 3 move the distance L upward, the lower surface of the head portion of the stopper bolt 8 comes into contact with the seating surface of the locking step portion 11a. Thereafter, the upper core 3 is coupled to the upper cavity die 2 by means of the stopper bolt 8, and they move upward together. As they begin to move upward, the lower surface of the upper cavity 2 separates from the upper surface of the peripheral portion Z of the molded glass element 4. The molded glass element 4 can thus be forced to remain on the lower core 5 without causing cracking of the molded product or its biting into the cores.

After completion of the die-opening operation, the molded glass element 4 remaining on the lower core 5 is taken out by a not-shown product removal device and automatically transported to an intended place. Since the molded glass element 4 can be surely left on the lower core 5 without cracking of the product or its biting into the cores by carrying out the die-opening operation in the above-described manner, the molded glass element can be securely taken out by the product removal device. Thus, troubles such as cracking of the molded glass element 4, adhesion of the molded product 4 to the upper core 3 upon die opening, etc. can be avoided. This makes it possible to continuously carry out molding cycles for the glass element 4 without interruptions, enabling high-efficiency production of the molded product.

While the present invention has been described with reference to the preferred embodiment which uses a spring made of a heat-resistant material, various variations are possible in the present invention.

For example, FIG. 3 illustrates a variation in which instead of the use of the elastic member 10 shown in FIG. 1, a passage 18 is provided in the upper die plate 1 and high-pressure air is supplied through the passage 18 into the recess 10A, thereby downwardly biasing the upper cavity die 2. It is also possible to supply high-pressure air onto the upper surface of the upper cavity die 2.

FIG. 4 shows a variation in which instead of the supply of high-pressure air, an air cylinder 20 is provided in the upper die plate 1 and the end of the rod 21 of the air cylinder 20 is pressed against the upper surface of the upper cavity die 2 so as to downwardly bias the upper cavity die 2.

Furthermore, it is also possible to provide a large-diameter head portion at the lower end of the rod and to allow the upper surface of the head portion to be locked by a seating member provided in the upper cavity die 2 so that the air cylinder can also perform the function of the stroke stopper bolt 8 shown in FIG. 1.

What is claimed is:

1. A die assembly for molding a glass element in a molding apparatus which molds the glass element by placing a glass element material between a pair of upper and lower die assemblies, and heating and pressing the pair of die assemblies and the glass element material, the die assembly comprising:
    an upper core having a peripheral surface, an outside diameter, and an upper molding face for the glass element;
    a lower core having a peripheral surface, an outside diameter, and a lower molding face for the glass element, the outside diameter of the lower core being larger than the outside diameter of the upper core;
    an upper cavity die in which the peripheral surface of the upper core is slidably fit;
    a lower cavity die in which the peripheral surface of the lower core is slidably fit;
    an upper die plate having a lower surface, the upper core and the upper cavity die being connected to the upper die plate;
    a lower die plate that supports the lower core and the lower cavity die at their lower ends
    means for downwardly biasing the upper cavity die, wherein said means presses the lower surface of the upper cavity die against both the upper surface of the lower cavity die and the peripheral portion of the glass element after commencement of die-opening operation when the upper core moves upward together with the upper die plate until a predetermined distance between the upper die plate and the upper cavity die has been reached, thereby forcing the glass element to remain on the lower cavity die side by keeping the position of the glass element; and
    a locking section that locks the upper cavity die onto the upper die plate and causes the upper cavity die to move upward together with the upper die plate after the predetermined distance has been reached, the locking section comprising a stopper bolt threadably engaging the upper cavity die and a hole formed in the upper die plate, the hole having a locking step portion on which a head portion of the stopper bolt is to be locked.

2. The die assembly for molding of a glass element according to claim 1, wherein said means for downwardly biasing the upper cavity die includes an elastic member disposed between the upper surface of the lower cavity die and the upper die plate that acts on the upper cavity die to bias the upper cavity die against both the lower cavity die and the peripheral portion of the glass element.

3. The die assembly for molding of a glass element according to claim 2, wherein the elastic member comprises a heat resistant ceramic material.

4. The die assembly for molding of a glass element according to claim 3, wherein the elastic member is a disc spring, a coil spring or a leaf spring.

5. The die assembly for molding of a glass element according to claim 1, further comprising a fixing bolt which attaches the upper core to the upper die plate, the stopper bolt and the fixing bolt having the same structure.

6. The die assembly for molding of a glass element according to claim 1, wherein said means for downwardly biasing the upper cavity die includes a high-pressure air supply passage in the upper cavity die for supplying high pressure air to downwardly bias the upper cavity die.

7. The die assembly for molding of a glass element according to claim 1, wherein said means for downwardly biasing the upper cavity die includes an air cylinder having a rod that is pressed against an upper surface of the upper cavity die.

* * * * *